Feb. 5, 1952     J. T. LEONARD     2,584,890
LUBRICANT MEASURING VALVE
Filed June 7, 1946     2 SHEETS—SHEET 2
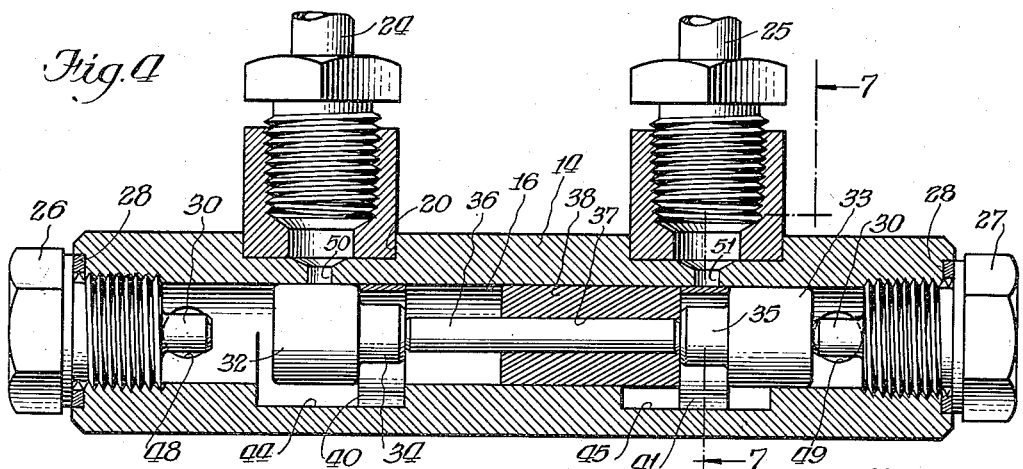
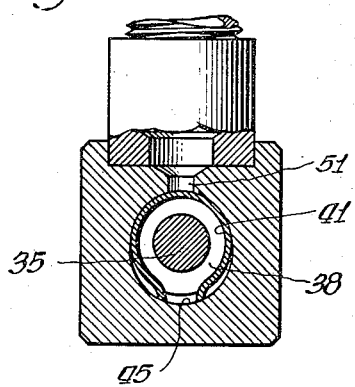
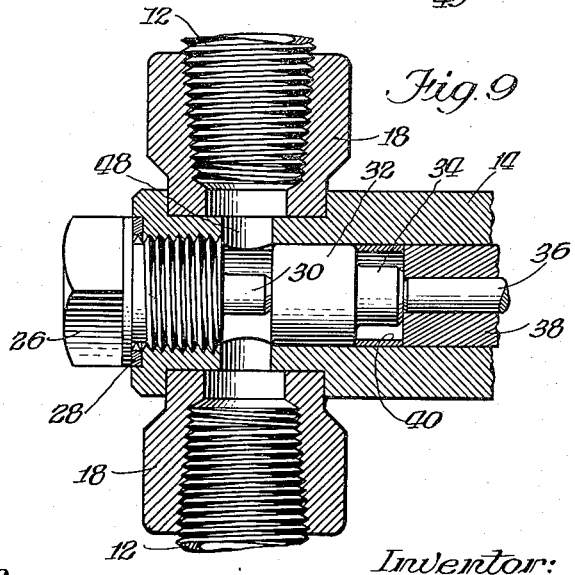
Inventor:
John T. Leonard
By: Hinkle, Horton, Ahlberg, Hansmann & Kipper
Attorneys.

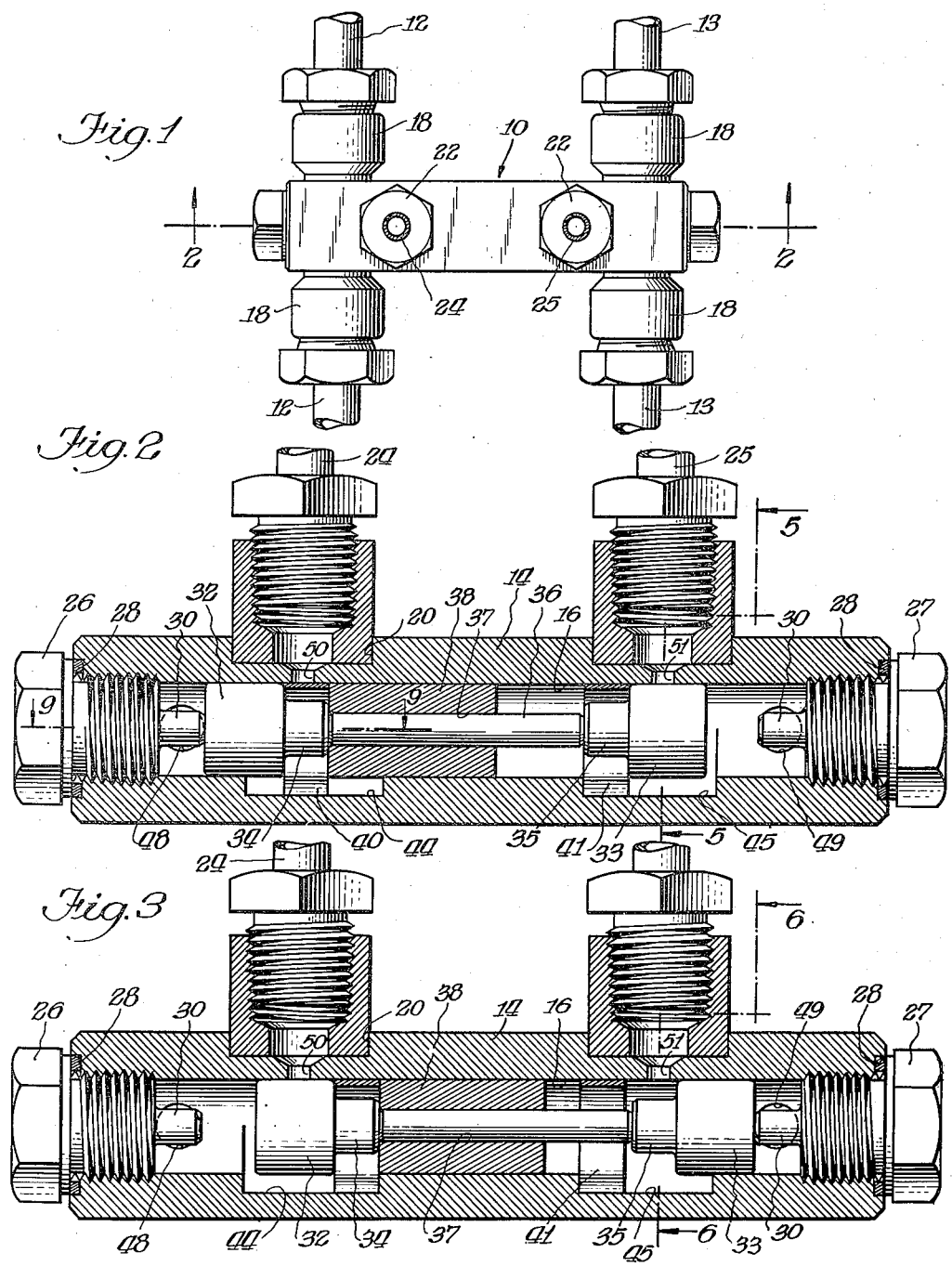

Patented Feb. 5, 1952

2,584,890

UNITED STATES PATENT OFFICE 2,584,890

LUBRICANT MEASURING VALVE

John T. Leonard, Evanston, Ill.

Application June 7, 1946, Serial No. 675,240

2 Claims. (Cl. 184—7)

My invention relates generally to lubricating apparatus and more particularly to improvements in measuring valves for centralized lubricating systems.

In lubricant measuring valves, or feeder valves, it is usually necessary that the relatively moving parts, such as valves and pistons, be lapped in the cylinders in which they are reciprocable. Such lapping operations are expensive and add appreciably to the cost of production of such valves. Unless the valves and pistons are lapped in their cylinders, appreciable leakage may take place, resulting in over lubrication of some of the bearings which is not only a waste of lubricant, but in many instances, the excess lubricant flowing from the bearings may cause damage to the products being processed by the machine. This is particularly true in connection with the lubrication of textile and food processing machines.

It is therefore the primary object of my invention to provide an improved measuring or feeder valve for centralized lubricating systems which may be manufactured by ordinary commercial manufacturing methods using customary commercial tolerances in the dimensions of the valves, pistons and cylinders, and in which the danger of leakage of excess lubricant to the bearings is nevertheless avoided.

A further object of my invention is to provide an improved measuring or feeder valve in which a separate sealing member is employed positively to shut off the outlets to the bearings during the portions of the operating cycle in which no lubricant is intended to flow to the bearings.

A further object is to provide an improved measuring or feeder valve for centralized lubricating apparatus which may be manufactured by non-precision manufacturing methods at low cost, and which will be efficient and durable in operation.

Other objects will appear from the following description, reference being had to the accompanying drawings, in which:

Fig. 1 is a plan view of a complete measuring valve of the invention as installed in a centralized lubricating system;

Fig. 2 is an enlarged central longitudinal sectional view taken on the line 2—2 of Fig. 1, showing the parts in the positions assumed at the beginning of an operating cycle;

Figs. 3 and 4 are views similar to Fig. 2, showing the parts in the positions assumed during different parts of the operating cycle;

Figs. 5, 6 and 7 are transverse sectional views taken on the lines 5—5 of Fig. 2, 6—6 of Fig. 3 and 7—7 of Fig. 4, respectively;

Fig. 8 is an isometric view of one of the seals; and

Fig. 9 is a fragmentary sectional view taken on the line 9—9 of Fig. 2.

The measuring valve is adapted to be utilized in a so-called multiple dual line lubricating system of the type shown for example in my copending application Serial No. 549,223, filed August 12, 1944, now Patent No. 2,440,410. In systems of this character, practically any desired number of measuring valves 10 are connected in parallel by conduits 12 and 13, and lubricant under pressure is alternately supplied, at predetermined intervals, to one of the conduits 12 and 13, while the other conduit is vented to a reservoir. The means for supplying lubricant under pressure may be of any one of a large variety of types, usually including a four-way valve, which may be manually or automatically operated first to connect a lubricant compressor to the line 12 and the line 13 to the reservoir, and then connect the compressor to line 13 while connecting the line 12 to the reservoir of the lubricant compressor.

The measuring valve 10 comprises a body 14 having a cylindrical bore 16. The conduits 12 and 13 are connected to the body 14 by suitable fittings threaded into plugs 18 which are pressed into suitable recesses 20 formed in the body 14 and may be brazed or welded in place. Similar hollow plugs 22 are secured to the body 14 and have conduits 24 and 25 suitably secured thereto, these conduits leading to bearings which are to be supplied with lubricant. The ends of the bore 16 are closed by plugs 26 and 27, suitable gaskets 28 being provided to assure a pressure tight seal. Each of the plugs is provided with a stop extension 30 for engagement respectively with valves 32 and 33. The centrally facing ends of the valves 42 and 33 are provided with reduced diameter extensions 34 and 35 respectively, these extensions normally engaging the ends of a rod 36 which is freely slidable through a central bore 37 formed in a piston 38.

Seals 40 and 41 are located between the piston 38 and the valves 32 and 33 respectively, these seals having locating end portions 43 engaging in milled bypass recesses 44 and 45 respectively. As best shown in Figs. 6, 7 and 8, the seals 40, 41 are of generally horseshoe shape having a cylindrical portion 46 and the end portions 43. These seals are preferably made of thin flexible resilient sheet metal, such as phosphor bronze or a copper-beryllium alloy.

The body 14 is provided with ports 48 and 49, communicating with the conduits 12 and 13, and ports 50 and 51 respectively, communicating with the conduits 24 and 25 which lead to the bearings to be lubricated.

With the parts in the positions shown in Fig. 2, lubricant is supplied to the conduit 12 and permitted to flow freely from the conduit 13.

Under these circumstances, the lubricant under pressure entering the port 48 exerts a force upon the valve 32 and the latter, due to its direct engagement with the piston 38 and through the rod 36, moves all of the movable parts in the cylinder, except seal 41, to the right—to the position in which they are shown in Fig. 3. During the course of such movement the valve 33, after cutting off the bypass 45, discharges lubricant from the right-hand end of the cylinder 16 through the port 49. The seal 41, due to the fact that it resiliently engages the wall of cylinder 16, remains in the position in which it is shown in Figs. 2 and 3.

After the parts have been moved to the positions in which they are shown in Fig. 3, the lubricant supplied to the inlet 48 may flow through the bypass 44 and will move the piston 38 to the right, thereby discharging lubricant contained between the right-hand end of the piston 38 and the valve 33 through the outlet port 51 to the bearing connected to the conduit 25. Such movement continues until the piston engages the seal 41 and moves it to the right to the position in which it is shown in Fig. 4, in which position it cuts off the outlet port 51. The movement of the piston is also arrested due to its engagement with the projections 35 of the valve 33, and the movement of the latter is limited by its engagement with the projection 30 of the plug 27. A half cycle of operation of the valve is thus completed.

This half cycle may be completed in one of the valves prior to the completion of the corresponding half cycle in other measuring valves being simultaneously supplied with lubricant under pressure through the conduit 12. Thus, without the seal 41, unless the piston 38 had a perfectly tight seal in the cylinder 16 and the rod 36 was similarly lubricant tight in the bore 37, lubricant would leak past the piston and through the outlet port 51 during the interval following the completion of the half cycle, and while the pressure is still being applied through the conduit 12. However, due to the use of the seal 41, such leakage is prevented. This seal is sufficiently flexible that the lubricant pressure forces it against the surface of the cylinder 16 around the outlet 15 and effects a lubricant-tight seal.

After the lubricant under pressure has been supplied through the conduit 12 for a sufficiently long interval to assure that all of the measuring valves connected thereto have operated through their first half cycle, the pressure in this conduit is relieved and lubricant under pressure supplied to the conduit 13. When this occurs the moving parts within the cylinder 16 operate in a manner opposite to that described above during the first half cycle, with the ultimate result that after discharging a measured quantity of lubricant through the outlet port 50, the piston 38 will move the seal 40 to the position in which it is shown in Fig. 2, thereby positively sealing the outlet port 50, and completing a full cycle of operation.

The valves 32 and 33 are effective to seal the ports 50 and 51 respectively when they are in the positions shown in Figs. 4 and 2, because when in this position the lubricant under pressure acts upon the lower half of each of these valves to force them upwardly into sealing engagement with the surface of the cylinder 16 surrounding the ports 50 and 51 respectively.

By virtue of the utilization of the seals 40 and 41, undesired flow or leakage of the lubricant to the bearings is prevented, and the parts may be manufactured using tolerances which may readily be maintained by ordinary methods of manufacture, making it possible to produce the valve without the necessity of lapping the piston and valves in the cylinder. The cost of manufacture is thereby greatly decreased as compared with the cost of similar valves not employing the seals.

While I have shown and described a particular embodiment of my invention, it will be apparent that numerous variations and modifications thereof may be made without departing from the underlying principles of the invention. I therefore desire, by the following claims, to include within the scope of the invention, all such variations and modifications by which substantially the results of my invention may be obtained through the use of substantially the same or equivalent means.

I claim:

1. A measuring valve for centralized lubricating systems comprising a body having a cylindrical bore therein and having bypasses adjacent the ends of the bore, a pair of valve members respectively movable relative to said bypasses to open and close them, a piston reciprocable in the bore between the two valves, a rod extending through the piston and forming a rigid connection between the valves, lubricant supply ports respectively opening into the opposite ends of the bore, outlet ports opposite the bypasses, and seals cooperable with the outlet ports and movable by said pistons and valves respectively, said seals being of thin resilient sheet metal, being engageable with the walls of the cylindrical bore, and being adapted to be pressed against the wall of the bore adjacent the outlets by lubricant pressure so as to seal the ports when moved thereover by the piston.

2. A lubricant measuring valve comprising a body in which there is a bore provided with an offset bypass and in which there is a discharge port leading from the bore at a point diametrically opposite the bypass, a valve to seal the port comprising a split thin resilient sheet metal band, a portion of which is shaped to conform to the cylindrical wall of the bore adjacent the port, and having end portions conformed to fit in the bypass and thereby to keep the valve from rotating and to maintain the cylindrical portion thereof in position to cover the port, said valve being stressed to resiliently engage the wall of the bore thereby to hold it in any position to which it may be moved.

JOHN T. LEONARD.

REFERENCES CITED

The following references are of record in the file of this patent:

UNITED STATES PATENTS

| Number | Name | Date |
| --- | --- | --- |
| 204,537 | Christy | June 4, 1878 |
| 277,157 | Pearce | May 8, 1883 |
| 446,819 | Ostergren | Feb. 17, 1891 |
| 660,670 | Tripp | Oct. 30, 1900 |
| 1,149,892 | Blattner | Aug. 10, 1915 |
| 1,901,649 | Huber | Mar. 14, 1933 |
| 1,935,150 | Fox | Nov. 14, 1933 |

FOREIGN PATENTS

| Number | Country | Date |
| --- | --- | --- |
| 813,910 | France | Mar. 8, 1937 |